United States Patent
Tay et al.

(10) Patent No.: US 12,112,573 B2
(45) Date of Patent: Oct. 8, 2024

(54) ASYMMETRIC FACIAL EXPRESSION RECOGNITION

(71) Applicant: Lemon Inc., Grand Cayman (KY)

(72) Inventors: Michael Leong Hou Tay, Los Angeles, CA (US); Wanchun Ma, Los Angeles, CA (US); Shuo Cheng, Los Angeles, CA (US); Chao Wang, Los Angeles, CA (US); Linjie Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 418 days.

(21) Appl. No.: 17/402,344

(22) Filed: Aug. 13, 2021

(65) Prior Publication Data

US 2023/0046286 A1    Feb. 16, 2023

(51) Int. Cl.
*G06K 9/00* (2022.01)
*G06F 18/21* (2023.01)
(Continued)

(52) U.S. Cl.
CPC ........ *G06V 40/176* (2022.01); *G06F 18/2193* (2023.01); *G06T 7/251* (2017.01);
(Continued)

(58) Field of Classification Search
CPC .. G06V 40/176; G06V 10/242; G06V 40/171; G06F 18/2193; G06T 7/251;
(Continued)

(56) References Cited

U.S. PATENT DOCUMENTS 10,108,852 B2 * 10/2018 Senechal ................ G16H 20/70
10,699,382 B2 *  6/2020 Vogels .................... G10D 13/20
(Continued)

FOREIGN PATENT DOCUMENTS

CN        108154133 A      6/2018
KR   20210052380 A  *   5/2021   ............. G06V 40/16

OTHER PUBLICATIONS

Ngo QT, Yoon S. Facial Expression Recognition Based on Weighted-Cluster Loss and Deep Transfer Learning Using a Highly Imbalanced Dataset. Sensors (Basel). May 5, 2020;20(9):2639. doi: 10.3390/s20092639. PMID: 32380751; PMCID: PMC7249188. (Year: 2020).*

(Continued)

*Primary Examiner* — Andrew M Moyer
*Assistant Examiner* — Aidan Keup
(74) *Attorney, Agent, or Firm* — BakerHostetler

(57) ABSTRACT

The present disclosure describes techniques for facial expression recognition. A first loss function may be determined based on a first set of feature vectors associated with a first set of images depicting facial expressions and a first set of labels indicative of the facial expressions. A second loss function may be determined based on a second set of feature vectors associated with a second set of images depicting asymmetric facial expressions and a second set of labels indicative of the asymmetric facial expressions. The first loss function and the second loss function may be used to determine a maximum loss function. The maximum loss function may be applied during training of a model. The trained model may be configured to predict at least one asymmetric facial expression in a subsequently received image.

17 Claims, 8 Drawing Sheets

(51) Int. Cl.
| | |
|---|---|
| *G06T 7/246* | (2017.01) |
| *G06T 13/40* | (2011.01) |
| *G06T 13/80* | (2011.01) |
| *G06V 10/24* | (2022.01) |
| *G06V 40/16* | (2022.01) |

(52) U.S. Cl.
CPC .............. *G06T 13/40* (2013.01); *G06T 13/80* (2013.01); *G06V 10/242* (2022.01); *G06V 40/171* (2022.01); *G06T 2207/20084* (2013.01); *G06T 2207/30201* (2013.01)

(58) Field of Classification Search
CPC ...................... G06T 13/40; G06T 13/80; G06T 2207/20084; G06T 2207/30201
See application file for complete search history.

(56) References Cited

U.S. PATENT DOCUMENTS

| | | | | |
|---|---|---|---|---|
| 11,756,291 | B2* | 9/2023 | Turkelson | G06V 30/19173 |
| 2014/0016860 | A1 | 1/2014 | Senechal et al. | |
| 2022/0138455 | A1* | 5/2022 | Nagano | G06T 5/006 382/118 |
| 2022/0327308 | A1* | 10/2022 | Song | G06N 3/045 |
| 2023/0043766 | A1* | 2/2023 | Chen | G06T 19/20 |

OTHER PUBLICATIONS

Contempt [online]. Paul Ekman Group, 2020 [retrieved on Mar. 12, 2024]. Retrieved from the internet: <URL: https://web.archive.org/web/20200922082719/https://www.paulekman.com/universal-emotions/what-is-contempt/> (Year: 2020).*
L. Lo, H. X. Xie, H.-H. Shuai and W.-H. Cheng, "Facial Chirality: Using Self-Face Reflection to Learn Discriminative Features for Facial Expression Recognition," 2021 IEEE International Conference on Multimedia and Expo (ICME), Shenzhen, China, 2021, pp. 1-6, doi: 10.1109/ICME51207.2021.9428120. (Year: 2021).*
International Patent Application No. PCT/SG2022/050531; Int'l Search Report; dated Mar. 9, 2023; 4 pages.
Fang et al.; "Facial asymmetry for expression recognition"; Information Technology; vol. 33 No. 11; Nov. 2009; p. 8-11 (contains English Abstract).
Fasel et al.; "Recognition of Asymmetric Facial Action Unit Activities and Intensities"; 15th Int'l Conf. on Pattern Recognition; ICPR-2000; Dec. 1999; 8 pages.
Niteesha Balla; "Five Popular Data Augmentation Techniques in Deep Learning"; https://dataaspirant.com/data-augmentation-techniques-deep-learning/#t-1598844713773; Dataaspirant; Aug. 2020; accessed Sep. 29, 2021; 21 pages.
Yan et al.; "FEAFA: A Well-Annotated Dataset For Facial Expression Analysis and 3D Facial Animation"; IEEE Int'l Conf. on Multimedia & Expo Workshops; 2019; 9 pages.
Vinciarelli et al.; "Social signal processing: Survey of an emerging domain"; Image and Vision Computing; Nov. 2009; 49 pages.
Cao et al.; "Real-time Facial Animation with Image-based Dynamic Avatars"; ACM Transactions on Graphics; vol. 35; 2016; 12 pages.
Lucey et al.; "The Extended Cohn-Kanade Dataset (CK+): A complete dataset for action unit and emotion-specified expression"; Computer Vision and Pattern Recognition Workshops; 2010; p. 94-101.
Mavadati et al.; "DISFA: A Spontaneous Facial Action Intensity Database"; IEEE Transactions of Affective Computing; vol. 4; 2013; 13 pages.
Bartlett et al.; "Fully Automatic Facial Action Recognition in Spontaneous Behavior"; IEEE Int'l Conf. on Automatic Face and Gesture Recognition; 2006; 6 pages.
McDuff et al.; "Affectiva-MIT Facial Expression Dataset (AM-FED): Naturalistic and Spontaneous Facial Expressions Collected "In-the-Wild""; IEEE Conf. on Computer Vision and Pattern Recognition; 2013; p. 881-888.
McKeown et al.; "The SEMAINE Database: Annotated Multimodal Records of Emotionally Colored Conversations between a Person and a Limited Agent"; IEEE Transactions on Affective Computing; vol. 3; 2012; p. 5-17 (Abstract Only).
Zhang et al.; "A high-resolution spontaneous 3D dynamic facial expression database"; IEEE Image & Vision Computing; vol. 32; 2013; 6 pages.
Valstar et al.; "FERA 2015—second Facial Expression Recognition and Analysis challenge"; IEEE Int'l Conf. and Workshops on Automatic Face and Gesture Recognition; 2015; 8 pages.
Paul Ekman Group LLC; "Facial action coding systems"; https://www.paulekman.com/facial-action-coding-system/; © 2021; accessed Oct. 21, 2021; 11 pages.
Wu et al.; "Deep Facial Action Unit Recognition From Partially Labeled Data"; Proceedings of the IEEE Int'l Conf. on Computer Vision; 2017; p. 3951-3959.
Li et al.; "Action Unit Detection With Region Adaptation, Multi-Labeling Learning and Optimal Temporal Fusing"; Proceedings of the IEEE Conf. on Computer Vision and Pattern Recognition; 2017; p. 1841-1850.
Walecki et al.; "Deep Structured Learning for Facial Action Unit Intensity Estimation"; Proceedings of the IEEE Conf. on Computer Vision and Pattern Recognition; 2017; p. 3405-3414.
Cao et al.; "Displaced dynamic expression regression for real-time facial tracking and animation"; ACM Transactions on Graphics; vol. 33; Jul. 2014; 10 pages.
Thies et al.; "Face2Face: Real-Time Face Capture and Reenactment of RGB Videos"; Proceedings of the IEEE Conf. on Computer Vision and Pattern Recognition; 2016; p. 2387-2395.
Li et al.; "Realtime facial animation with on-the-fly correctives"; ACM Transactions on Graphics; vol. 32; 2013; 10 pages.
Bartlett; "Automatic Recognition of Facial Actions in Spontaneous Expressions"; Journal of Multimedia; vol. 1; Sep. 2006; p. 22-35.
Alyuz et al.; "3D Face Recognition Benchmarks on the Bosphorus Database with Focus on Facial Expressions"; Biometrics and Identity Management; 2008; p. 57-66.
Lucey et al.; "Painful data: The UNBC-McMaster should pain expression archive database"; IEEE Int'l Conf. on Automatic Face & Gesture Recognition; 2011; p. 57-64.
Cao et al.; "FaceWarehouse: A 3D Facial Expression Database for Visual Computing"; IEEE Transactions on Visualization & Computing Graphics; vol. 20; 2014; p. 413-425.
King; "Dlib-ml: A Machine Learning Toolkit"; Journal of Machine Learning Research; vol. 10; 2009; p. 1755-1758.
Kazemi et al.; "One Millisecond Face Alignment with an Ensemble of Regression Trees"; IEEE Conf. on Computer Vision and Pattern Recognition; 2014; p. 1867-1874.
Krizhevksy et al.; "ImageNet Classification with Deep Convolutional Neural Networks"; Int'l Conf. on Neural Information Processing Systems; 2012; p. 1097-1105.
Simoyan et al.; Very Deep Convolutional Networks for Large-Scale Image Recognition; Int'l Conf. on Learning Representations; 2015; 14 pages.
Szegedy et al.; "Going Deeper with Convolutions"; IEEE Conf. on Computer Vision and Pattern Recognition; 2015; 9 pages.
Rudovic et al.; "Context-sensitive Dynamic Ordinal Regression for Intensity Estimation of Facial Action Units"; IEEE Transactions on Pattern Analysis and Machine Intelligence; vol. 37; 2015; p. 944-958.
Srivastava et al.; "Dropout: A Simple Way to Prevent Neural Networks from Overfitting"; Journal of Machine Learning Research; vol. 15; 2014; p. 1929-1958.
Jia et al.; "Caffe: Convolutional Architecture for Fast Feature Embedding"; ACM Int'l Conf. on Multimedia; 2014; p. 675-678.
Walecki et al.; "Copula Ordinal Regression for Joint Estimation of Facial Action Unit Intensity"; Computer Vision and Pattern Recognition; 2016; p. 4902-4910.
Eidinger et al.; "Age and Gender Estimation of Unfiltered Faces"; IEEE Transactions on Information Forensics and Security; vol. 12; 2014; p. 2170-2179.

(56) References Cited

OTHER PUBLICATIONS

Lepetit et al.; "EPnP: An Accurate O(n) Solution to the PnP Problem"; Int'l Journal of Computer Vision; vol. 81; 2009; p. 155-166.

* cited by examiner

400

Determine a first loss function based on a first set of feature vectors associated with a first set of images depicting facial expression and a first set of labels indicative of the facial expression 402

Determine a second loss function based on a second set of feature vectors associated with a second set of images depicting asymmetric facial expressions and a second set of labels indicative of the asymmetric facial expressions 404

Determine, based on the first loss function and the second loss function, a maximum loss function 406

Apply the maximum loss function during training of a model, wherein the trained model is configured to predict at least one asymmetric facial expression in a subsequently received image 408

FIG. 4

ASYMMETRIC FACIAL EXPRESSION RECOGNITION

BACKGROUND

Image recognition represents a set of methods for detecting and analyzing images to enable the automation of a specific task. Image recognition is a technology capable of identifying places, people, objects, and many other types of elements within an image and drawing conclusions based on analyzing them. Improvements in image recognition techniques are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 shows an example method for facial expression recognition.

DETAILED DESCRIPTION OF ILLUSTRATIVE EMBODIMENTS

Figure 1:
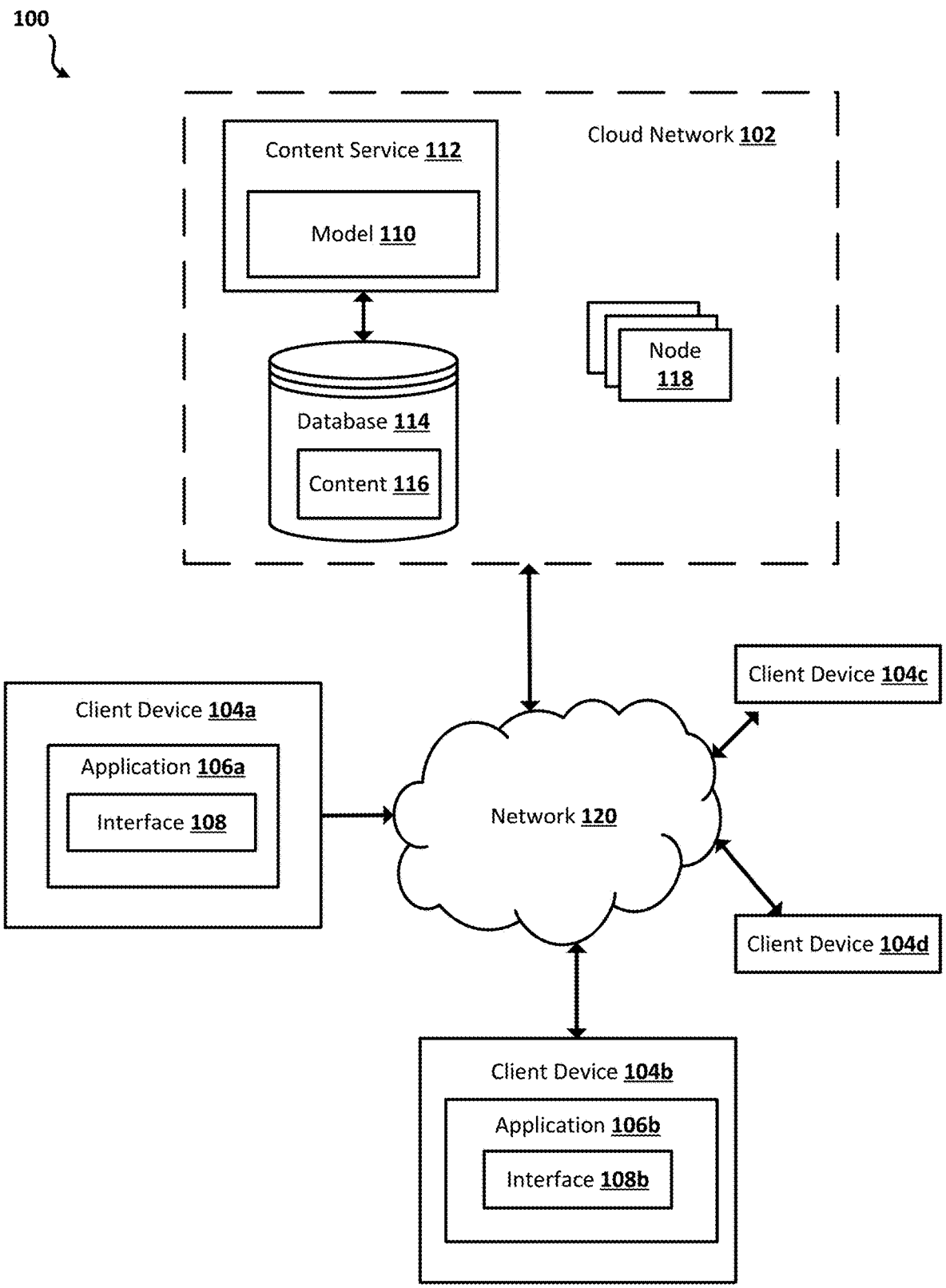
FIG. 1 shows an example system for distributing content.

Facial expressions play a key role in conveying non-verbal information regarding human feelings and/or emotions. Accordingly, facial expression recognition has become increasingly prevalent. Facial expression recognition may be used for many practical applications, including but not limited to human-machine interaction and facial animation. As the prevalence of facial expression recognition continues to increase, improvements in facial expression recognition techniques may be desirable.

Many facial expressions are asymmetric. For example, for many facial expressions, the left side of the face may more expressive than the right side of the face (or vice versa). As a result, when making an expression, the left side of the face may look different than the right side of the face. For example, the right eye may be moved in a manner that is different than the manner that the left eye is moved, the right side of the mouth may be moved in a manner that is different than the manner that the left side of the mouth is moved, etc. Current facial expression recognition techniques may have difficulty analyzing such asymmetric facial expressions. Accordingly, improvements in asymmetric facial expression recognition techniques may be desirable.

Some facial expression recognition techniques attempt to improve the performance of asymmetric facial expression recognition by augmenting the dataset used to train the model used to predict facial expressions. Image data augmentation is perhaps the most well-known type of data augmentation and involves creating transformed versions of images in the training dataset that belong to the same class as the original image. Transforms may include a range of operations from the field of image manipulation, such as shifts, flips, zooms, and much more. The intent is to expand the training dataset with new, plausible examples. This means, variations of the training set images that are likely to be seen by the model. For example, a horizontal flip of a picture of a cat may make sense, because the photo could have been taken from the left or right. Modern deep learning algorithms, such as the convolutional neural network, or CNN, may learn features that are invariant to their location in the image. Augmentation can further aid in this transform invariant approach to learning and can aid the model in learning features that are also invariant to transforms such as left-to-right to top-to-bottom ordering, light levels in photographs, and more.

The training set may be augmented in order to increase the number of asymmetric samples in the training dataset. For example, data augmentation may be accomplished through spatial transform, e.g. the facial image may be flipped horizontally and attributes associated with left and right part of the face may be swapped (e.g. activation signals of left_eye_closed and right_eye_closed may be swapped, etc.). By augmenting the training set, the model may get more learning experience, and may therefore perform better when predicting asymmetric expressions.

However, by augmenting the training dataset in this way, the amount of storage required for the training data will be doubled. Accordingly, an improved asymmetric facial expression recognition technique that performs well, while not requiring a massive amount of storage space is desired. An asymmetry loss may be introduced during model training to help refine asymmetrical expressions. The asymmetry loss may act as an indirect augmentation of the original input. A first loss function for the original expression parameters and ground truth labels associated with the original expression parameters may be determined. A second loss function for asymmetrical expression parameters and ground truth labels associated with the asymmetrical expression parameters may be determined. Using the first loss function and the second loss function, a maximum loss function may be determined. This maximum loss function (i.e., the asymmetry loss function) may be used to train the model for predicting facial expressions. By using the maximum loss function to train the model, it minimizes the risk of the model hitting a local minimum during application (e.g. when predicting facial expressions).

A facial expression recognition model, such as one that is trained using an asymmetry loss, may be utilized by a variety of different systems or entities. For example, a content distributor may utilize the model for facial expression recognition. FIG. 1 illustrates an example system 100 for distributing content. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a content service 112. The content service 112 may comprise a content streaming service, such as an Internet protocol video streaming service. The content service 112 may be configured to distribute content 116 via a variety of transmission techniques. The content service 112 is configured to provide the content 116, such as video, audio, textual data, a combination thereof, and/or the like. The content 116 may comprise content streams (e.g., video stream, audio stream, information stream), content files (e.g., video file, audio file, text file), and/or other data. The content 116 may be stored in a database 114. For example, the content service 112 may comprise a video sharing service, a video hosting platform, a content distribution platform, a collaborative gaming platform, and/or the like.

In an embodiment, the content 116 distributed or provided by the content service 112 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

In an embodiment, the content 116 may be output to different client devices 104 via the network 120. The content 116 may be streamed to the client devices 104. The content stream may be a stream of short videos received from the content service 112. The plurality of client devices 104 may be configured to access the content 116 from the content service 112. In an embodiment, a client device 104 may comprise a content application 106. The content application 106 outputs (e.g., display, render, present) the content 116 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

In an embodiment, a user may use the content application 106 on a client device 104 to create content and upload the short video to the cloud network 102. The client devices 104 may access an interface 108 of the content application 106. The interface 108 may comprise an input element. For example, the input element may be configured to allow users to create the content. To create the content, the user may give the content application 106 permission to access an image capture device, such as a camera, or a microphone of the client device 104. After the user has created the content, the user may use the content application 106 to upload the content to the cloud network 102 and/or to save the content locally to the user device 104. The content service 112 may store the uploaded content and any metadata associated with the content in one or more databases 114.

The plurality of computing nodes 118 may process tasks associated with the content service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the content service 112 comprises a model 110. The model 110 may be, for example, a machine learning model. The model 110 may be utilized, at least in part, to predict and/or analyze facial expressions, including asymmetric facial expressions. As discussed above, traditional facial expression recognition techniques do not perform well when predicting asymmetric facial expressions and/or require a prohibitive amount of storage space.

The model 110 may be able to accurately predict asymmetric facial expressions without being trained on an augmented dataset requiring a prohibitive amount of storage space. Instead, the model 110 may be trained using an asymmetry loss. The asymmetry loss may act as an indirect augmentation of the original input. A first loss function for the original expression parameters and ground truth labels associated with the original expression parameters may be determined. A second loss function for asymmetric expression parameters and ground truth labels associated with the asymmetric expression parameters may be determined. Using the first loss function and the second loss function, a maximum loss function may be determined. This maximum loss function may be used to train the model used to predict facial expressions. By using the maximum loss function to train the model, it minimizes the risk of the model hitting a local minimum during application (e.g. when predicting facial expressions). As a result, the quality of facial expression recognition may be improved.

Figure 2:
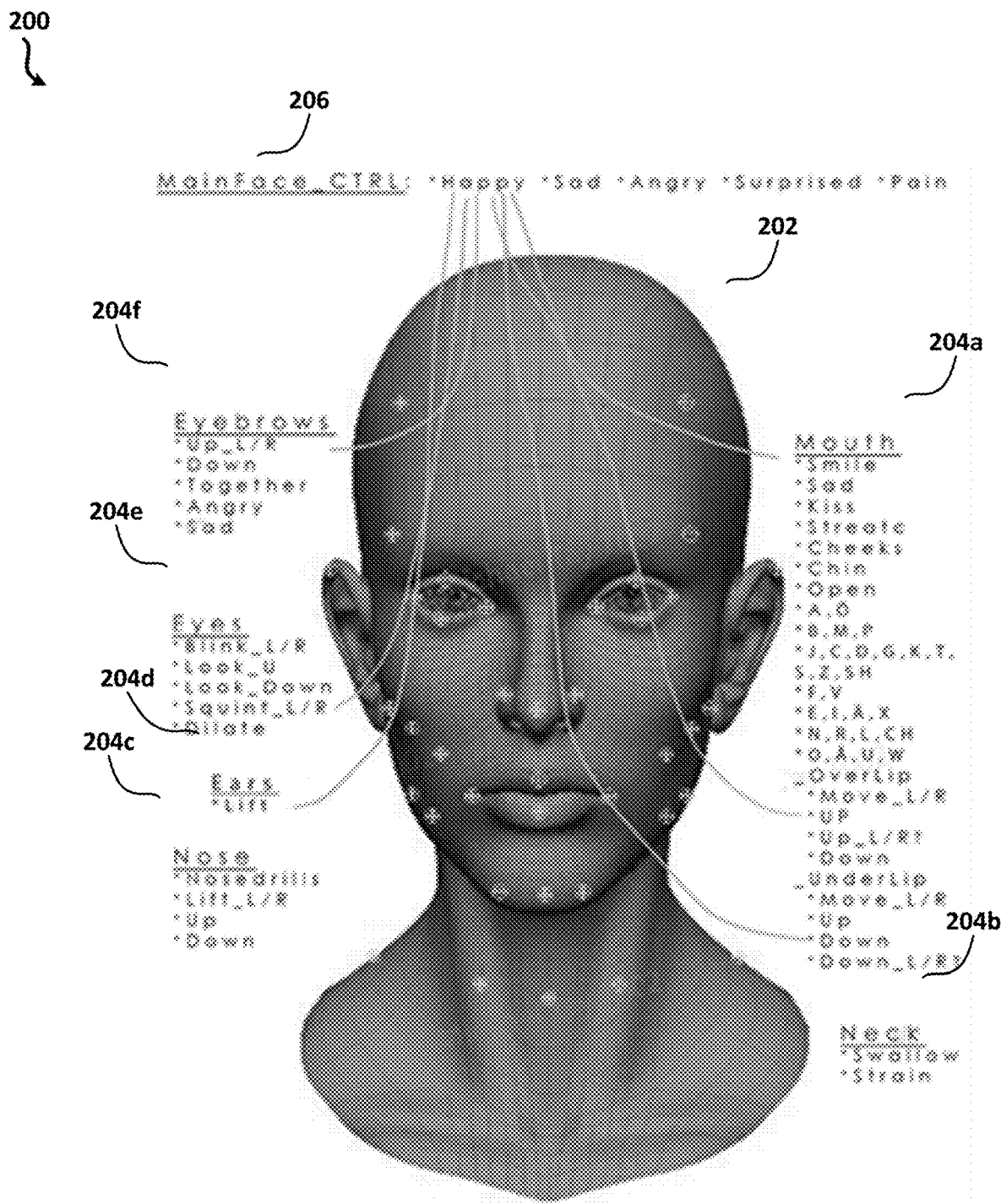
FIG. 2 shows an example facial expression analysis.

FIG. 2 illustrates an example facial expression analysis 200. The facial expression analysis 200 may be generated, for example, by a facial expression model (e.g. model 110). The facial expression analysis 200 may indicate an analysis 206 of an expression associated with a face 202. The analysis 206 of the expression associated with the face 202 may be generated, for example, based on an analysis of various facial features 204*a-f*. For example, the analysis 206 of the facial expression may indicate that the expression is one of happiness, sadness, anger, surprise, pain, or any other emotion or feeling. Whether the analysis 206 of the facial expression indicates that the expression is one of happiness, sadness, anger, surprise, pain, etc. may depend on how the various facial features 204*a-f* are moved or positioned on the face 202.

However, the expression depicted on the face 202 of FIG. 2 is largely symmetrical (e.g. the left side of the face looks the same as the right side of the face). As discussed above, a model may have a more difficult time predicting asymmetric facial expressions (e.g., expressions where the left side of the face does not look the same as the right side of the face). For example, when a person makes an expression that indicates happiness or surprise, the left side of his/her face may look slightly different than the right side of his/her face —one of the eyes/eyebrows may be raised slightly more than the other eye/eyebrow, and one of the corners of the mouth may be turned up more than the other corner of his mouth. Due to the asymmetry that may be found in facial expressions, a traditional facial expression recognition model may have a difficult time accurately predicting the facial expressions being made.

Figure 3:
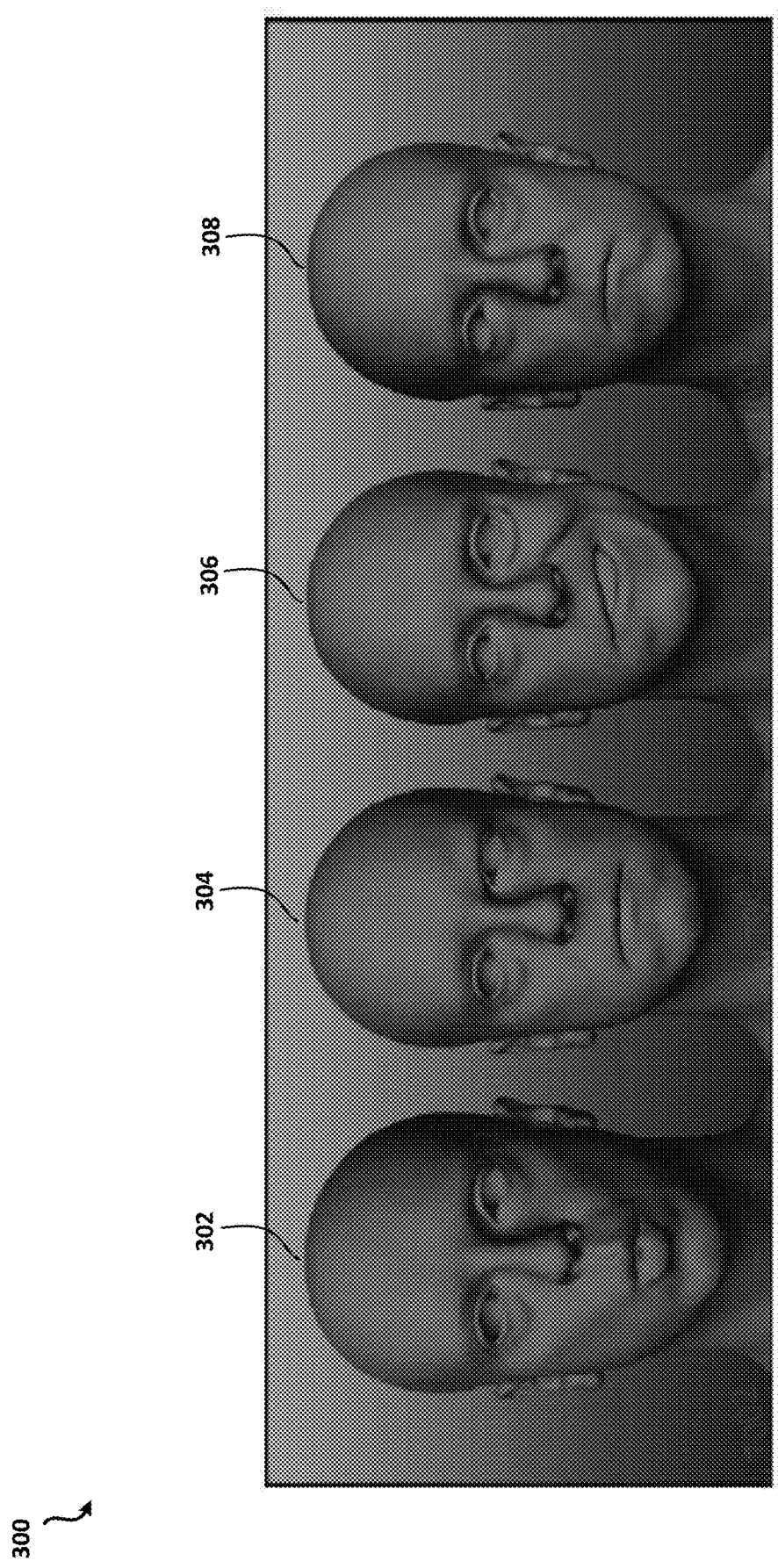
FIG. 3 shows an example set of facial expressions, some symmetric and some asymmetric.

Throughout the course of a video, an individual may make a variety of different facial expressions. FIG. 3 illustrates an example set 300 of facial expressions. The set 300 of facial expressions may include any number of symmetric and/or asymmetric facial expressions, such as the four facial expressions 302, 304, 306, 308 depicted in FIG. 3. The facial expressions 302, 304, 306, 308 may be facial expressions that an individual makes throughout the course of a video. For example, throughout the course of a video, the individual may first make the facial expression 302, then the facial expression 304, followed by the facial expression 306, and then the facial expression 308. However, it should be appreciated that the individual may make the facial expressions in any other order and/or may make different or additional facial expressions throughout the course of a video (some of which may or may not be asymmetric).

Some of the facial expressions in the set 300 of facial expressions may be symmetric, while other may be asymmetric. For example, the expressions 302 and 304 are largely symmetric, whereas the expressions 306 and 308 are asymmetric. In expression 306, the individual's left side of his mouth is moved in a manner that is not the same at the manner in which the right side of his mouth is moved. Likewise, in expression 308, the individual's left side of his mouth is moved in a manner that is not the same at the manner in which the right side of his mouth is moved. As discussed above, a traditional facial expression recognition model may have a difficult time accurately predicting the facial expressions 306 and 308.

As also discussed above, some facial expression recognition techniques attempt to improve the performance of asymmetric facial expression recognition by augmenting the dataset used to train the model used to predict facial expressions. The training set may be augmented in order to increase the number of asymmetric samples in the training dataset. For example, data augmentation may be accomplished through spatial transform, e.g. the facial image may be flipped horizontally and attributes associated with left and right part of the face may be swapped (e.g. activation signals of left_eye_closed and right_eye_closed may be swapped, etc.). By augmenting the training set, the model may get more learning experience, and may therefore perform better when predicting asymmetric expressions.

However, by augmenting the training dataset in this way, the amount of storage required for the training data will be doubled. Accordingly, an improved asymmetric facial expression recognition technique that performs well, while not requiring a massive amount of storage space is desired. FIG. 4 illustrates an example process 400 performed by a computing device. The computing device may perform the process 400 to train a facial expression recognition model (e.g., model 110) in a manner that does not require prohibitive amounts of storage space. Once trained, the facial expression recognition model may be utilized to predict facial expressions, including asymmetric facial expressions (such as facial expressions 306, 308 shown in FIG. 3). Although depicted as a sequence of operations in FIG. 4, those of ordinary skill in the art will appreciate that various embodiments may add, remove, reorder, or modify the depicted operations.

The process 400 introduces an asymmetry loss function during model training to help refine asymmetrical expressions. The asymmetry loss function may act as an indirect augmentation of the original input. The asymmetry loss function is associated with and determined based on two different loss functions. At 402, a first loss function may be determined based on a first set of feature vectors associated with a first set of images depicting facial expressions and a first set of labels indicative of the facial expressions. For example, the first set of images may be taken from a video. The facial expressions depicted by the first set of feature vectors may comprise asymmetric facial expressions (such as facial expressions 306, 308 shown in FIG. 3).

The first set of feature vectors may be generated through a model based on the first set of images. The first set of feature vectors may include a set of lists of numbers depicting facial expressions in the first set of images recognized by the model. The first set of labels (i.e., ground truth data) indicate the real or true facial expressions in the first set of images. The first set of feature vectors and the first set of labels may include a set of blend shape coefficients. Each blend shape coefficient may be associated with a particular facial feature or facial region. Blend shape coefficients may include, but are not limited to, blend shape coefficients associated with the eyes, mouth/jaw, eyebrows/cheeks/nose, or tongue.

Blend shape coefficients associated with the eyes may include: a coefficient describing closure of the eyelids over the left eye, a coefficient describing movement of the left eyelids consistent with a downward gaze, a coefficient describing movement of the left eyelids consistent with a rightward gaze, a coefficient describing movement of the left eyelids consistent with a leftward gaze, a coefficient describing movement of the left eyelids consistent with an upward gaze, a coefficient describing contraction of the face around the left eye, a coefficient describing a widening of the eyelids around the left eye, a coefficient describing closure of the eyelids over the right eye, a coefficient describing movement of the right eyelids consistent with a downward gaze, a coefficient describing movement of the right eyelids consistent with a leftward gaze, a coefficient describing movement of the right eyelids consistent with a rightward gaze, a coefficient describing movement of the right eyelids consistent with an upward gaze, a coefficient describing contraction of the face around the right eye, and/or a coefficient describing a widening of the eyelids around the right eye.

Blend shape coefficients associated with the mouth/jaw may include: a coefficient describing forward movement of the lower jaw, a coefficient describing leftward movement of the lower jaw, a coefficient describing rightward movement of the lower jaw, a coefficient describing an opening of the lower jaw, a coefficient describing closure of the lips independent of jaw position, a coefficient describing contraction of both lips into an open shape, a coefficient describing contraction and compression of both closed lips, a coefficient describing leftward movement of both lips together, a coefficient describing rightward movement of both lips together, a coefficient describing upward movement of the left corner of the mouth, a coefficient describing upward movement of the right corner of the mouth, a coefficient describing downward movement of the left corner of the mouth, a coefficient describing downward movement of the right corner of the mouth, a coefficient describing backward movement of the left corner of the mouth, a coefficient describing backward movement of the right corner of the mouth, a coefficient describing leftward movement of the left corner of the mouth, a coefficient describing rightward movement of the left corner of the mouth, a coefficient describing movement of the lower lip toward the inside of the mouth, a coefficient describing movement of the upper lip toward the inside of the mouth, a coefficient describing outward movement of the lower lip, a coefficient describing outward movement of the upper lip, a coefficient describing upward compression of the lower lip on the left side, a coefficient describing upward compression of the lower lip on the right side, a coefficient describing downward movement of the lower lip on the left side, a coefficient describing downward movement of the lower lip on the right side, a coefficient describing upward movement of the upper lip on the left side, and/or a coefficient describing upward movement of the upper lip on the right side.

Blend shape coefficients associated with the eyebrows/cheeks/nose or tongue may include: a coefficient describing downward movement of the outer portion of the left eyebrow, a coefficient describing downward movement of the outer portion of the right eyebrow, a coefficient describing upward movement of the inner portion of both eyebrows, a coefficient describing upward movement of the outer portion of the left eyebrow, a coefficient describing upward movement of the outer portion of the right eyebrow, a coefficient describing outward movement of both cheeks, a coefficient describing upward movement of the cheek around and below the left eye, a coefficient describing upward movement of the cheek around and below the right eye, a coefficient describing a raising of the left side of the nose around the nostril, a coefficient describing a raising of the right side of the nose around the nostril, and/or a coefficient describing extension of the tongue.

By way of example and without limitation, the first loss function $L_{\delta(a)}$ may be based on the L1-smooth Huber loss as follows:

$$L_{\delta(a)} = \begin{cases} \dfrac{a^2}{2\delta} & \text{for } |a| < \delta \\ \delta(|a| - \dfrac{1}{2}\delta), & \text{otherwise} \end{cases}$$

wherein a represents the difference between the first set of labels (i.e., ground truth data) and the first set of feature vectors (e.g., predicted blend shape results). The L-1 smooth Huber loss function is a loss function used in robust regression, that is less sensitive to outliers in data than the squared error loss. This function is quadratic for small values of a, and linear for large values, with equal values and slopes of the different sections at the two points where the absolute value of a is equal to 6. The first set of feature vectors (i.e., predicted results) may be generated based on the first set of images. The first set of feature vectors may be generated through the model via $F(A, L_{\delta(a)})$ during each step of a network (e.g., a neural network), wherein $A \in R^{m \times n}$ denotes the input image matrix associated with the first set of images, and $L_{\delta(a)}$ represents the first loss function.

At 404, a second loss function $L_{\delta(b)}$ may be determined based on a second set of feature vectors associated with a second set of images depicting asymmetric facial expressions and a second set of labels indicative of the asymmetric facial expression. By way of example and without limitation, the second loss function $L_{\delta(b)}$ may be based on the L1-smooth Huber loss. The second set of feature vectors may be generated through the model based on the second set of images. For example, the second set of feature vectors may be generated via $F(A_{i(n+1-j)}, L_{\delta(b)})$, wherein $A_{i(n+1-j)}$ represents input image matrix associated with the second set of images depicting asymmetric facial expressions (e.g., horizontally flipped images of the subset of the first set of images), b represents the difference between the second set of labels (i.e., ground truth data) and the second set of feature vectors (e.g., predicted blend shape results), and $L_{\delta(b)}$ represents the second loss function.

An asymmetric loss function (i.e., a global loss function) may be generated based on the first loss function and the second loss function. At 406, a maximum loss function (i.e., the asymmetric loss function) may be determined based on the first loss function and the second loss function. For example, the maximum loss function (i.e., the asymmetric loss function), $L_{asymmetry\delta(a,b)}$, may be denoted as follows:

$$L_{asymmetry\delta(a,b)} = \max(L_{\delta(a)}, L_{\delta(b)})$$

wherein $L_{\delta(a)}$ represents the first loss function, and $L_{\delta(b)}$ represents the second loss function.

By way of example and without limitation, the second set of labels each may be generated based on the flipped at least one portion of the one image of the subset of the first set of images. For example, the second set of labels, $C'_{gt}(e)$, may be generated based on $$C'_{gt}(e) = \begin{cases} \text{flip } (e) & \text{if } e \cap B \\ e, & \text{otherwise} \end{cases}$$

wherein e represents the asymmetrical blend shape expressions associated with the second of set images, and B represents all possible blend shape expressions associated with the first set of images.

In one embodiment, the second set of images may be generated via a data augmentation of a subset of the first set of images comprising asymmetric facial expression. For example, the subset of the first set of images depicts asymmetric facial expressions (such as facial expressions 306, 308 shown in FIG. 3); the second set of images each may be similar to one image of the subset of the first set of images, but may have at least one portion flipped (e.g., horizontally flipped) relative to the one image of the subset of the first set of images. The second set of labels each may be generated based on the flipped at least one portion of the one image of the subset of the first set of images. In another embodiment, the second set of images may be further augmented by flipping (e.g., horizontally flipping) at least one portion of at least one image of the second set of images. The second set of labels may also be augmented based on the flipped at least one portion of the at least one image.

Figure 5:
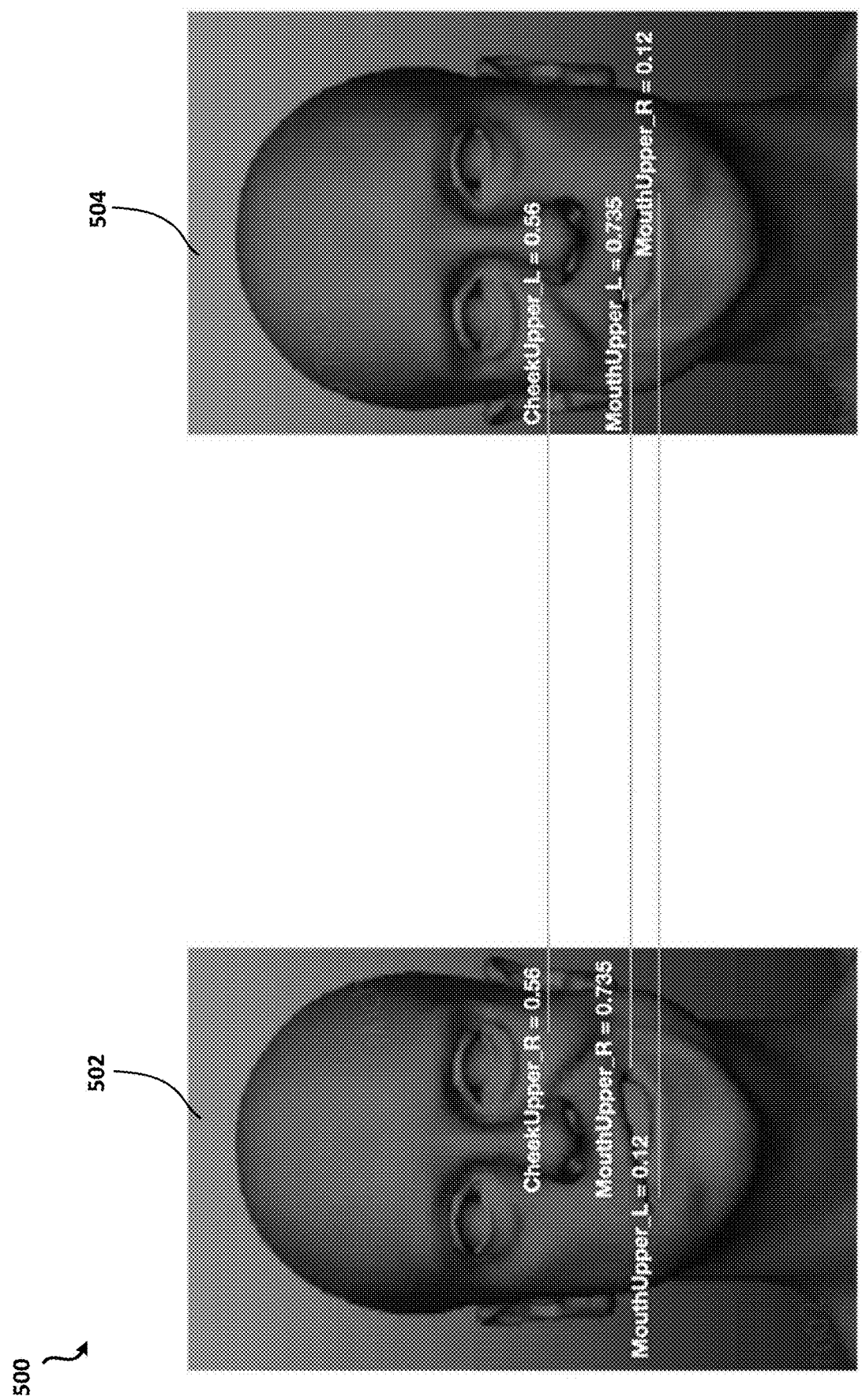
FIG. 5 shows example image used to augment a training dataset for a facial expression recognition model.

FIG. 5 depicts an example image and an example flipped image. For example, the first image 502 depicts a facial asymmetric expression. The face in the image 502 is raising the right corner of his mouth higher than the left corner of his mouth. This is indicating by the blend shape coefficients: the coefficient describing upward movement of the right corner of the mouth (0.735) is greater than the coefficient describing upward movement of the left corner of the mouth (0.12). The first image 502 is also associated with a coefficient of 0.56 that describes upward movement of the cheek around and below the right eye. The second image 504 is a horizontally flipped version of the first image 502. The blend shape coefficients associated with the image 504 are generated based on flipping at least some of the blend shape coefficients associated with the image 502. For example, in the second image 504, the coefficient describing upward movement of the left corner of the mouth is 0.735, the coefficient describing upward movement of the right corner of the mouth is 0.12, and the coefficient of 0.56 describes upward movement of the cheek around and below the left eye.

The second set of feature vectors may include a set of lists of numbers depicting the asymmetric facial expressions in the second set of images recognized by the model. The second set of labels (i.e., ground truth data) indicate the real or true asymmetric facial expressions in the second first set of images. The second set of feature vectors and the second set of labels may include a set of blend shape coefficients. Each blend shape coefficient may be associated with a particular facial feature or facial region. Blend shape coefficients may include, but are not limited to, blend shape coefficients associated with the eyes, mouth/jaw, eyebrows/cheeks/nose, or tongue.

As described above, a maximum loss function (i.e., the asymmetric loss function) may be determined based on the first loss function and the second loss function. The maximum loss function may be applied to a model, such as a facial expression recognition model, for training the model to accurately predict facial expressions including asymmetric facial expressions. At 408, the maximum loss function may be applied to a model during training of the model. The trained model may be configured to predict at least one asymmetric facial expression in a subsequently received image (such as a video frame). By using the maximum loss function to train the model, it minimizes the risk of the model hitting a local minimum during application (e.g. when predicting facial expressions). Once the maximum loss function is found, the model may then be trained on any set of images that include asymmetric facial expressions (these images may or may not include the set of images used to derive the maximum loss function).

Figure 6:
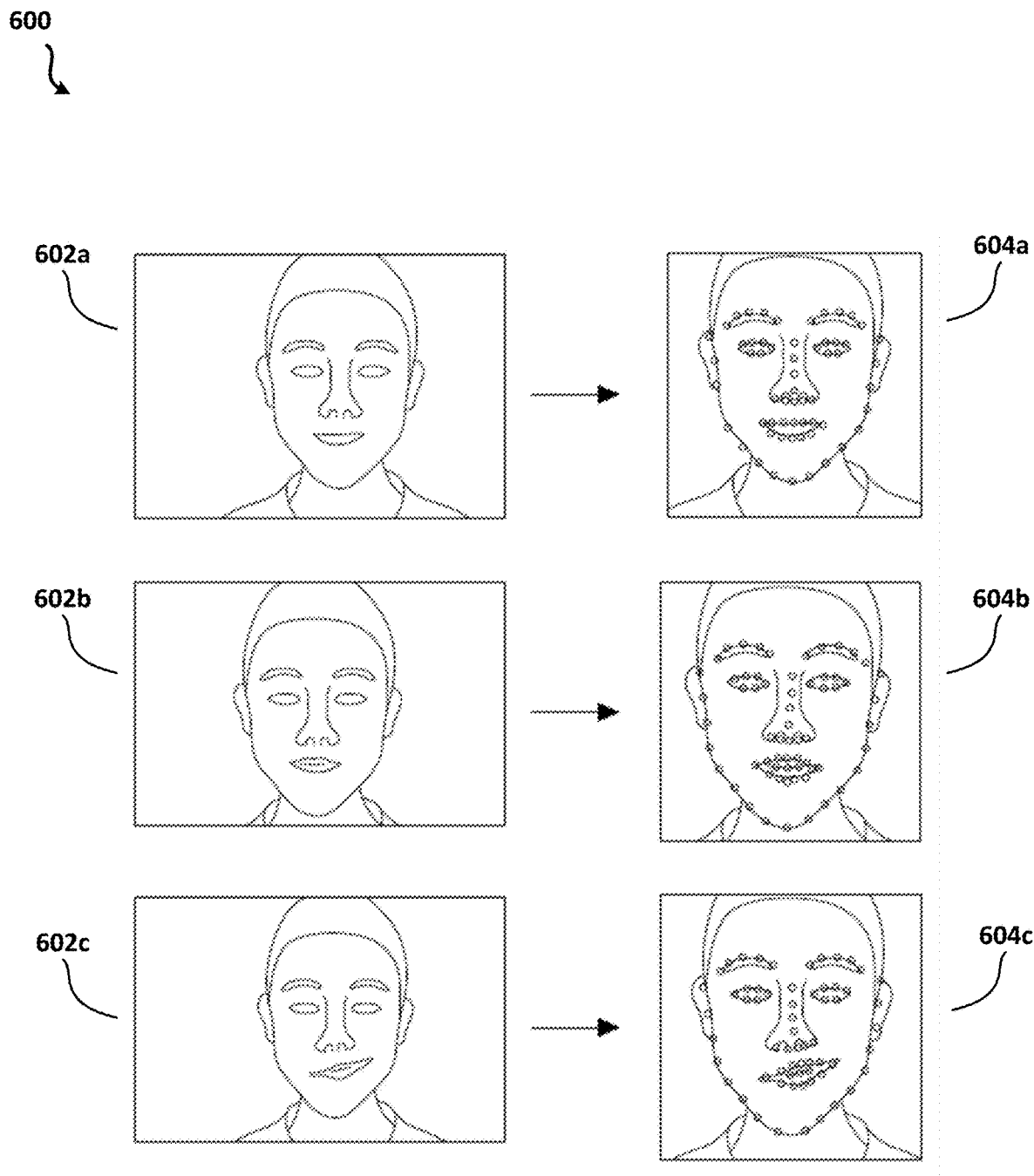
FIG. 6 shows an example set of images depicting various facial expressions.

FIG. 6 shows an exemplary set of images 600 that may be fed into a system for training a facial expression recognition model. The set of images 600 may include images taken from a video (e.g., various frames taken from a video). The set of images 600 may include any number of images, such as the images 602a-c. One or more of the images in the set of images 600 may depict a face having an asymmetric expression. For example, in FIG. 6, the image 602c depicts a face having an asymmetry expression, as the boy's mouth is turned up only at one corner. The remainder of the images (602a-b) are largely symmetrical.

One or more facial features may be detected in and/or extracted from each of the images 602a-c. The facial features may be detected and/or extracted in any suitable manner. For example, any existing algorithm for facial feature extraction may be used, including but not limited to: Principle Component Analysis (PCA), Linear Discriminant Analysis (LDA), skin color, wavelet, and/or Artificial Neural Network (ANN).

In an embodiment, a plurality of facial landmarks may be generated for each of the images 602a-c. Each facial landmark may correspond to a particular facial feature and may indicate that facial feature's location (e.g. a pair of coordinates) on the image. The images 604a-c depict the facial landmarks that have been generated for each of the images 602a-c. For example, the image 604a depicts the facial landmarks that have been generated for the image 602a, the image 604b depicts the facial landmarks that have been generated for the image 602b, and the image 604c depicts the facial landmarks that have been generated for the image 602c.

In an embodiment, each of the plurality of facial landmarks may be associated with a number overlaid on the image of the face. Each of the numbers corresponds to a particular facial region, such as one of the left eye, a right eye, a left pupil, a right pupil, a left eyebrow, a right eyebrow, a nose, an upper lip, a lower lip, or a remaining portion of the face. More than one landmark may correspond to a single facial region. For example, nine of the landmarks in the set of facial landmarks may correspond to the right eyebrow and nine other the landmarks in the set of facial landmarks may correspond to the left eyebrow. A plurality of landmarks may similarly correspond to each of the left eye, the right eye, the left pupil, the right pupil, the nose, the upper lip, the lower lip, or the remaining portion of the face.

Figure 7:
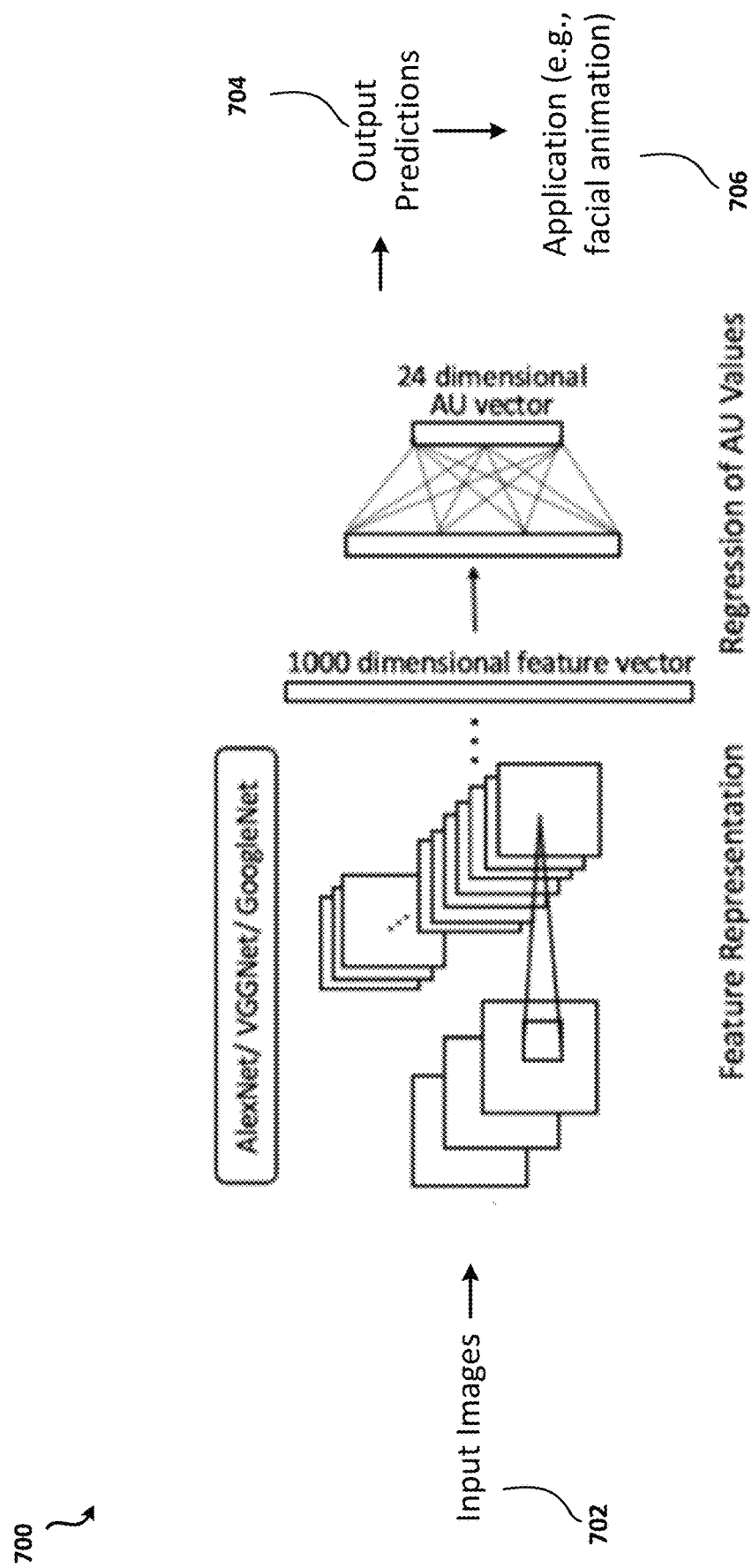
FIG. 7 shows an example application of a facial expression recognition model.

FIG. 7 illustrates an example system 700 for controlling an animation based on predictions of facial expression output from a trained facial expression recognition model. The system may receive images as input 702. The system 700 may apply a neural network (e.g., a trained facial expression model) to generate a feature representation (e.g., feature vector) associated with each image. The neural network may include, by way of example and without limitation, VGGnet (VGGnet has three fully—connected layers: the first two have 4076 channels each and the third has 1000 channels, 1 for each class), Alexnet (Alexnet is a convolutional neural network that contains eight layers with weights; the first five are convolutional and the remaining three are fully connected. The output of the last fully-connected layer is fed to a 1000-way softmax which produces a distribution over the 1000 class labels), GoogLeNet (GoogLeNet is a 22-layer deep convolutional neural network), and/or any other suitable type of neural network.

The initiation output of the system 700 may be a high dimensional (e.g. 1000 dimensional) feature vector, for each input image. Regression may be performed on the high dimensional feature vector(s). For example, linear regression may be performed on the high dimensional feature vector(s). Linear regression is a supervised learning algorithm used to predict a real-valued output. The linear regression model is a linear combination of the features of the input examples. For example, the real-valued output may be a 24-dimensional feature vector. The 24-dimensional feature vector may be, for example, a facial action unit (AUs) vector. Each 24-dimensional feature vector may indicate a predicted expression associated with an image among the input images.

The initiation output of the system 700 may be a high dimensional (e.g. 1000 dimensional) feature vector. Regression may be performed on the high dimensional feature vector(s). For example, linear regression may be performed on the high dimensional feature vector(s). Linear regression is a supervised learning algorithm used to predict a real-valued output. The linear regression model is a linear combination of the features of the input examples. For example, the real-valued output may be a 24-dimensional feature vector. The 24-dimensional feature vector may be, for example, a facial action unit (AUs) vector. Each 24-dimensional feature vector may indicate a predicted expression associated with an image selected from the set of flipped images. The system 700 may output predications 704 of facial expressions associated with the input images.

The application 706 of the trained model may comprise using the output of the trained model to control an animation. For example, the application 706 of the trained model may comprise using the output of the trained model to control a facial animation. The trained model may output predications associated with one or more input images. Each of the input images may depict a face. The face, in at least some of the input images, may have an asymmetric facial expression. The face, in at least some of the other input images, may have a symmetric facial expression. The trained model may generate a prediction associated with the expression in each of the input images. For example, the trained model may predict whether the expression associated with each of the input images is one of admiration, adoration, amusement, anger, anxiety, awe, awkwardness, boredom, calmness, confusion, craving, disgust, empathic pain, entrancement, excitement, fear, happiness, horror, interest, joy, nostalgia, relief, sadness, satisfaction, surprise, and/or any other emotion or feeling. The prediction associated with each image may be used to control a facial animation. For example, if the trained model predicts that a facial expression depicted in an image is one or horror, a facial animation may be controlled to depict an expression of horror.

Figure 8:
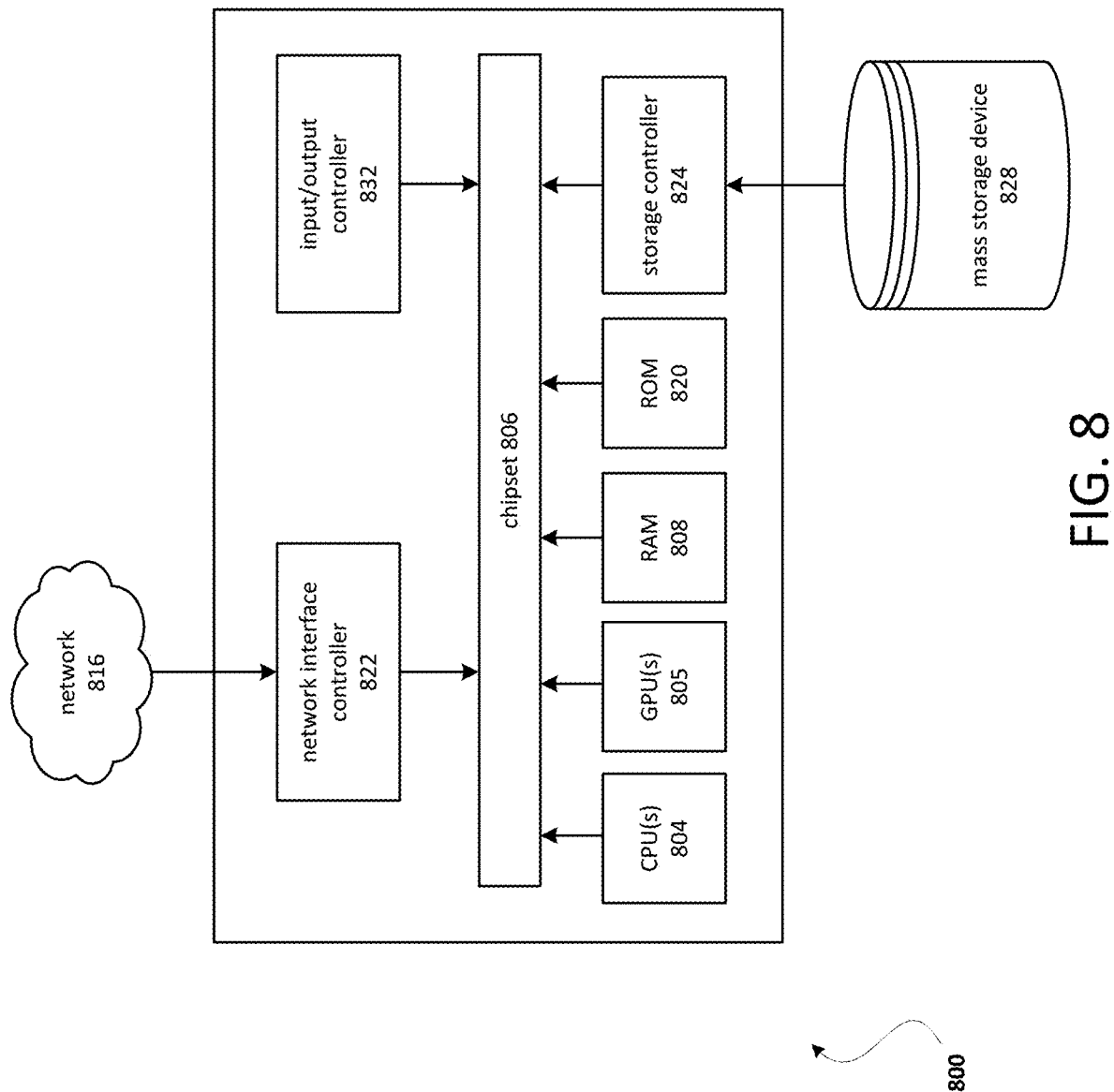
FIG. 8 shows an example computing device which may be used to perform any of the techniques disclosed herein.

FIG. 8 illustrates a computing device that may be used in various aspects, such as the services, networks, modules, and/or devices depicted in FIG. 1. With regard to the example architecture of FIG. 1, the cloud network 102, the model 110, the plurality of client devices 104*a-d*, etc. may each be implemented by one or more instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random-access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN). The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. The mass storage device 828 may comprise a management component 810. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on the mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described herein.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
    determining a first loss function based on a first set of feature vectors associated with a first set of images depicting facial expressions and a first set of labels indicative of the facial expressions;
    determining a second loss function based on a second set of feature vectors associated with a second set of images depicting asymmetric facial expressions and a second set of labels indicative of the asymmetric facial expressions;
    determining, based on the first loss function and the second loss function, a maximum loss function;
    applying the maximum loss function during training of a model, wherein the trained model is configured to predict different types of asymmetric facial expressions in input images; and
    controlling a facial animation using the predicted different types of asymmetric facial expressions.

2. The method of claim 1, wherein the first set of labels comprises a first quantity of blend shape coefficients and the second set of labels comprises a second quantity of blend shape coefficients, the second quantity being smaller than the first quantity.

3. The method of claim 1, wherein the second set of labels comprises blend shape coefficients indicative of the asymmetric facial expressions associated with at least one of an eye, a mouth, a jaw, an eyebrow, a cheek, a nose, or a tongue.

4. The method of claim 1, wherein the second set of images correspond to a subset of the first set of images.

5. The method of claim 1, further comprising:
augmenting the second set of images by flipping at least one portion of at least one image of the second set of images.

6. The method of claim 5, further comprising:
augmenting the second set of labels based on at least one flipped portion of at least one image.

7. The method of claim 1, further comprising:
determining the first set of feature vectors by inputting the first set of images into a neural network and performing regression on a different set of feature vectors with a higher dimension than the first set of feature vectors, the different set of feature vectors being associated with the first set of images.

8. A system, comprising:
at least one computing device in communication with a computer memory, the computer memory comprising computer-readable instructions that upon execution by the at least one computing device, configure the system to perform operations comprising:
determining a first loss function based on a first set of feature vectors associated with a first set of images depicting facial expressions and a first set of labels indicative of the facial expressions;
determining a second loss function based on a second set of feature vectors associated with a second set of images depicting asymmetric facial expressions and a second set of labels indicative of the asymmetric facial expressions;
determining, based on the first loss function and the second loss function, a maximum loss function;
applying the maximum loss function during training of a model, wherein the trained model is configured to predict different types of asymmetric facial expressions in input images; and
controlling a facial animation using the predicted different types of asymmetric facial expressions.

9. The system of claim 8, wherein the first set of labels comprises a first quantity of blend shape coefficients and the second set of labels comprises a second quantity of blend shape coefficients, the second quantity being smaller than the first quantity.

10. The system of claim 8, wherein the second set of labels comprises blend shape coefficients indicative of the asymmetric facial expressions associated with at least one of an eye, a mouth, a jaw, an eyebrow, a cheek, a nose, or a tongue.

11. The system of claim 8, wherein the second set of images correspond to a subset of the first set of images.

12. The system of claim 8, the operations further comprising:
augmenting the second set of images by flipping at least one portion of at least one image of the second set of images.

13. The system of claim 12, the operations further comprising:
augmenting the second set of labels based on at least one flipped portion of at least one image.

14. The system of claim 8, the operations further comprising:
determining the first set of feature vectors by inputting the first set of images into a neural network and performing regression on a different set of feature vectors with a higher dimension than the first set of feature vectors, the different set of feature vectors being associated with the first set of images.

15. A non-transitory computer-readable storage medium, storing computer-readable instructions that upon execution by a processor cause the processor to implement operations comprising:
determining a first loss function based on a first set of feature vectors associated with a first set of images depicting facial expressions and a first set of labels indicative of the facial expressions;
determining a second loss function based on a second set of feature vectors associated with a second set of images depicting asymmetric facial expressions and a second set of labels indicative of the asymmetric facial expressions;
determining, based on the first loss function and the second loss function, a maximum loss function;
applying the maximum loss function during training of a model, wherein the trained model is configured to predict different types of asymmetric facial expressions in input images; and
controlling a facial animation using the predicted different types of asymmetric facial expressions.

16. The non-transitory computer-readable storage medium of claim 15, wherein the first set of labels comprises a first quantity of blend shape coefficients and the second set of labels comprises a second quantity of blend shape coefficients, the second quantity being smaller than the first quantity.

17. The non-transitory computer-readable storage medium of claim 15, the operations further comprising:
determining the first set of feature vectors by inputting the first set of images into a neural network and performing regression on a different set of feature vectors with a higher dimension than the first set of feature vectors, the different set of feature vectors being associated with the first set of images.

* * * * *